(12) United States Patent
Moore

(10) Patent No.: US 9,733,972 B1
(45) Date of Patent: Aug. 15, 2017

(54) COMPUTER IMPLEMENTED SYSTEM AND METHOD AND COMPUTER PROGRAM PRODUCT FOR DETERMINING AN OPTIMAL CONFIGURATION FOR A COMPUTING SYSTEM USING ROOT MEAN SQUARE NORMALIZATION

(71) Applicant: VCE COMPANY, LLC, Richardson, TX (US)

(72) Inventor: Kenneth Moore, Cork (IE)

(73) Assignee: VCE Company, LLC, Richardson, TX (US)

( * ) Notice: Subject to any disclaimer, the term of this patent is extended or adjusted under 35 U.S.C. 154(b) by 0 days.

(21) Appl. No.: 14/843,808

(22) Filed: Sep. 2, 2015

(51) Int. Cl.
*G06F 9/455* (2006.01)
*H04L 12/24* (2006.01)
*H04W 24/02* (2009.01)
*G06Q 10/06* (2012.01)

(52) U.S. Cl.
CPC ........ *G06F 9/45558* (2013.01); *H04L 41/142* (2013.01); *H04W 24/02* (2013.01); *G06F 2009/45562* (2013.01); *G06Q 10/06* (2013.01)

(58) Field of Classification Search
None
See application file for complete search history.

(56) References Cited

U.S. PATENT DOCUMENTS

| | | | | |
|---|---|---|---|---|
| 8,874,705 B1 * | 10/2014 | Satish | ................... | G06F 11/008 709/220 |
| 9,396,009 B2 * | 7/2016 | Biran | ................... | G06F 9/45558 |
| 2002/0072956 A1 * | 6/2002 | Willems | ................. | G06Q 10/04 705/7.31 |

(Continued)

FOREIGN PATENT DOCUMENTS

| | | | | |
|---|---|---|---|---|
| GB | EP 1709537 A2 * | 10/2006 | .......... | G06F 11/3447 |
| MY | WO 2014163484 A1 * | 10/2014 | ........... | G06F 9/5038 |

OTHER PUBLICATIONS

Tang et al, A Quality-Driven Algorithm for Resource Scheduling Based on Market Model on Grid, 2007, IEEE, ICPPW 2007, pp. 1-6.*

(Continued)

*Primary Examiner* — Abu Ghaffari
(74) *Attorney, Agent, or Firm* — Womble Carlyle Sandridge & Rice LLP; Jeffrey R. McFadden, Esq.

(57) ABSTRACT

A system, method, and computer program product for determining an optimal configuration for a computing system. For example, a method may include accessing functional requirements and resource constraint information. Functional requirements are converted into hardware requirements and functional models are generated, each of which satisfies the hardware requirements. Functional models are converted to functional utilization models, and functional utilization model values are generated for the functional utilization models. The method also may include defining a resource model for each of the functional models and converting the resource models to resource utilization models. A resource utilization model value is generated for each of the resource utilization models. A set of viable models is identified based on the values for the functional utilization models and the resource utilization models, and then a best fit model is identified based on the determined functional model value and the determined resource constraint model value.

17 Claims, 10 Drawing Sheets

(56) References Cited

U.S. PATENT DOCUMENTS

| | | | | | |
|---|---|---|---|---|---|
| 2003/0023841 | A1* | 1/2003 | Atherton | ............... | H04L 41/083 713/1 |
| 2005/0086331 | A1* | 4/2005 | Wadia | .................. | H04L 41/145 709/221 |
| 2009/0112780 | A1* | 4/2009 | Chen | .................. | G06F 9/44505 706/19 |
| 2010/0042563 | A1* | 2/2010 | Livingston | ........... | G06K 9/6226 706/12 |
| 2011/0072253 | A1* | 3/2011 | Iqbal | ..................... | G06Q 10/04 713/1 |
| 2011/0077994 | A1* | 3/2011 | Segev | .................... | G06Q 10/06 705/7.16 |
| 2012/0144008 | A1* | 6/2012 | Yuyitung | .............. | G06F 9/5066 709/223 |
| 2012/0310870 | A1* | 12/2012 | Caves | ................ | G06F 11/2247 706/14 |
| 2013/0006686 | A1* | 1/2013 | O'Sullivan | ............ | G06Q 10/06 705/7.13 |
| 2013/0138806 | A1* | 5/2013 | Gohad | ................... | H04L 43/08 709/224 |
| 2014/0052773 | A1* | 2/2014 | Deng | ..................... | H04L 67/42 709/203 |
| 2014/0229607 | A1* | 8/2014 | Jung | ................... | H04L 43/0876 709/224 |
| 2014/0244230 | A1* | 8/2014 | Apte | ........................ | G06F 9/50 703/13 |

OTHER PUBLICATIONS

Lei et al, Automating Resource Selection and Configuration in Inter-Clouds through a Software Product Line Method, 2015, IEEE 8th International Conference on Cloud Computing, pp. 726-733.*

Bhe et al, QoS and Performance Optimization with VM Provisioning Approach in Cloud Computing Environment, 2012, NUiCONE-2012, pp. 1-5.*

Quin et al, Using Feature Modelling and Automations to Select among Cloud Solutions, 2012, IEEE, PLEASE 2012, pp. 17-20.*

* cited by examiner

COMPUTER IMPLEMENTED SYSTEM AND METHOD AND COMPUTER PROGRAM PRODUCT FOR DETERMINING AN OPTIMAL CONFIGURATION FOR A COMPUTING SYSTEM USING ROOT MEAN SQUARE NORMALIZATION

FIELD OF THE DISCLOSURE

Aspects of the disclosure relate to computing technology and, more particularly, to a computer implemented system and method, and computer program product, for determining an optimal configuration for a computing system, such as, a converged infrastructure.

BACKGROUND

Configuring and optimizing a complex computing system comprising a plurality of computing components requires balancing functional requirements with resource constraints. From the functional requirements, all viable configurations can be identified. The specifications for each viable configuration may be very detailed and may include requirements for the major hardware components of a computing system, i.e. compute, network and storage components. Once the viable configurations have been identified, a design engineer selects one or more configurations that would satisfy the functional requirements and the resource constraints. If one of the functional requirements is virtualization, then the individual components of the computing system must be suitable for use in a converged infrastructure environment.

A disadvantage associated with the current systems and methods for configuring and optimizing a computing system is lack of consistency. Two design engineers, provided with the same functional requirements and resource constraints may, nevertheless, recommend different computing systems. This is because the process of balancing functional requirements with resource constraints is inherently subjective. What is needed, therefore, is a system and method for determining an optimal configuration for a computing system, such as, a converged infrastructure, that overcomes one or more of the disadvantages associated with known systems and method for doing so.

SUMMARY

A system, method, and computer program product for determining an optimal configuration for a computing system, such as, a converged infrastructure. For example, a method in accordance with some embodiments may include accessing functional requirements and resource constraint information. The functional requirements are converted into hardware requirements and a plurality of functional models is generated, each of which satisfies the hardware requirements. The functional models are converted to functional utilization models, and functional utilization model values are generated for each of the functional utilization models. The method also may include defining a resource model for each of the functional models and converting each of the resource models to a resource utilization model. A resource utilization model value is generated for each of the resource utilization models. A set of viable models is identified based on the values for the functional utilization models and the resource utilization models, and then a best fit model is identified based on the determined functional model value and the determined resource constraint model value.

It will be appreciated that the above summary is provided merely for purposes of summarizing some example embodiments so as to provide a basic understanding of some aspects of the disclosure. As such, it will be appreciated that the above described example embodiments are merely examples of some embodiments and should not be construed to narrow the scope or spirit of the disclosure in any way. It will be appreciated that the scope of the disclosure encompasses many potential embodiments, some of which will be further described below, in addition to those herein summarized. Further, other aspects and advantages of embodiments disclosed herein will become apparent from the following detailed description taken in conjunction with the accompanying drawings which illustrate, by way of example, the principles of the described embodiments.

BRIEF DESCRIPTION OF THE DRAWINGS

Figure 1:
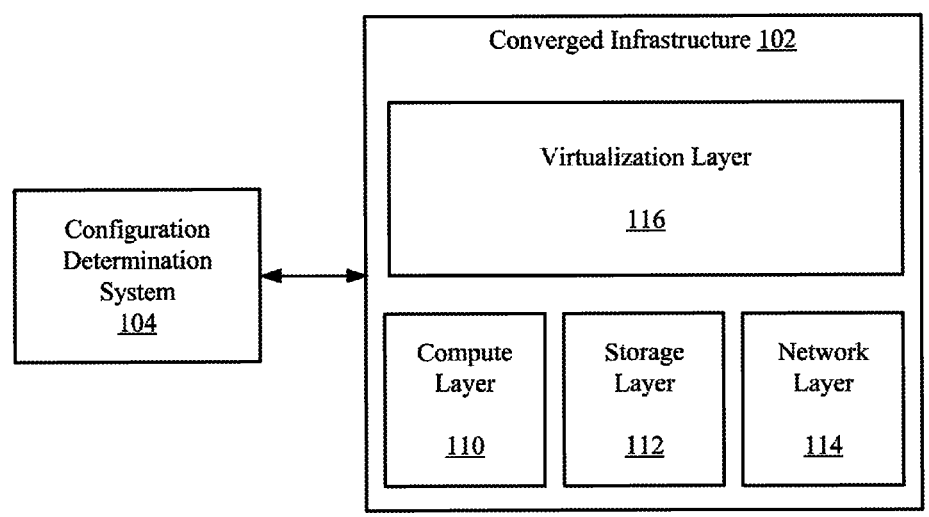
Figure 2:
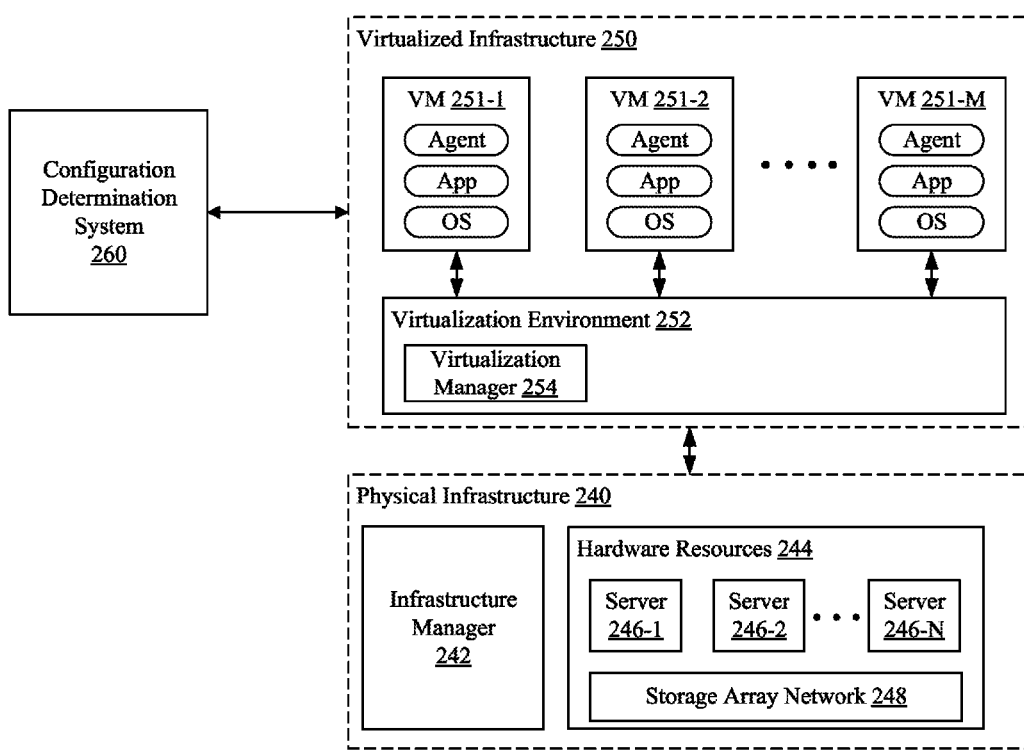
Figure 3:
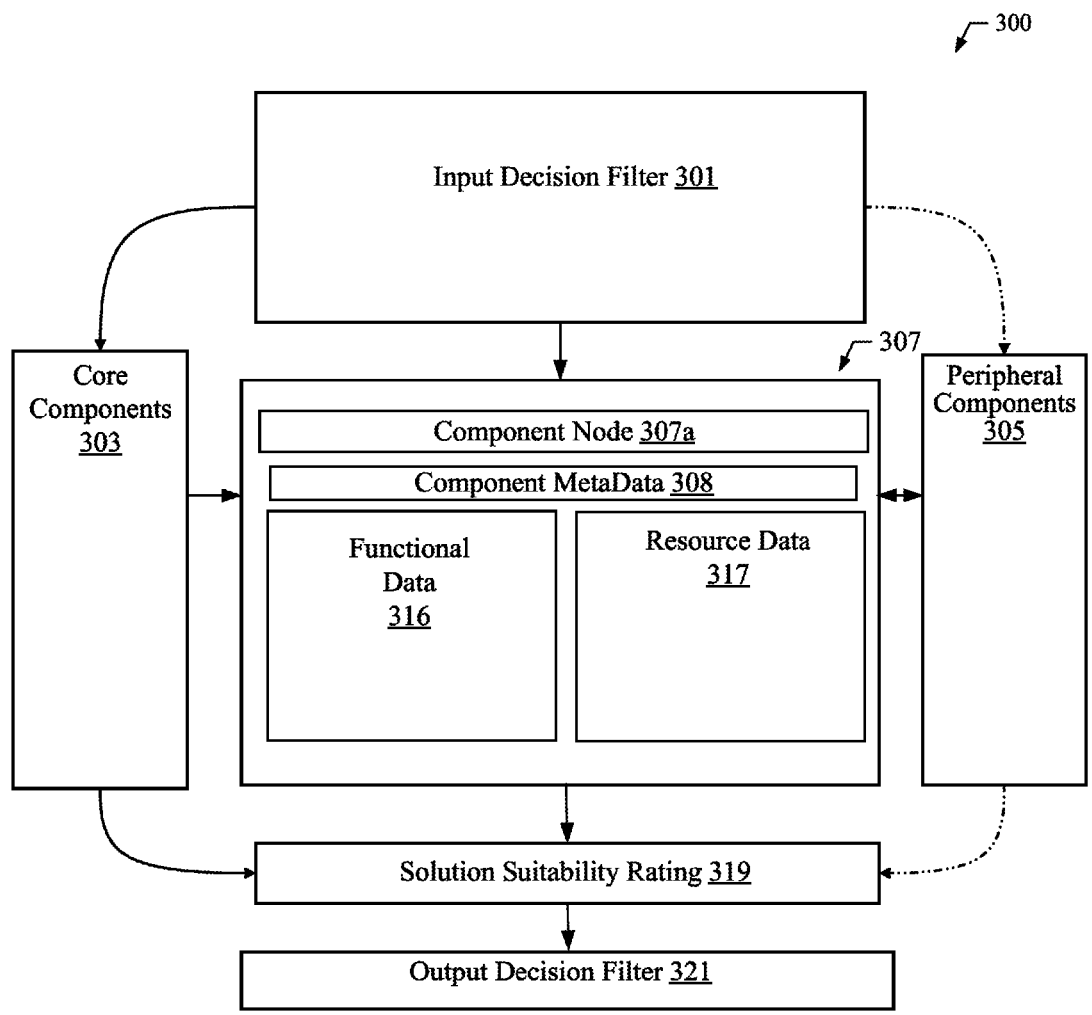
Figure 4:
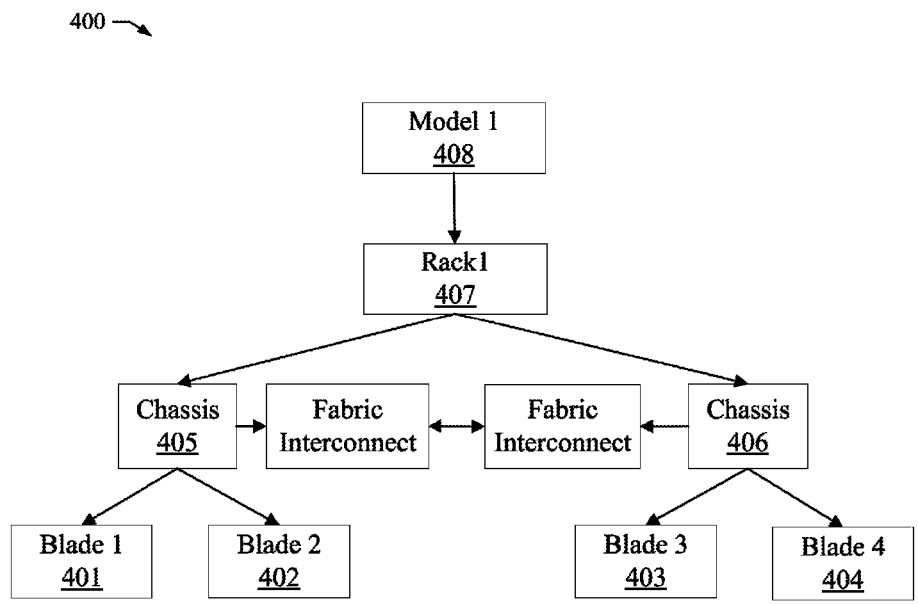
Figure 5:
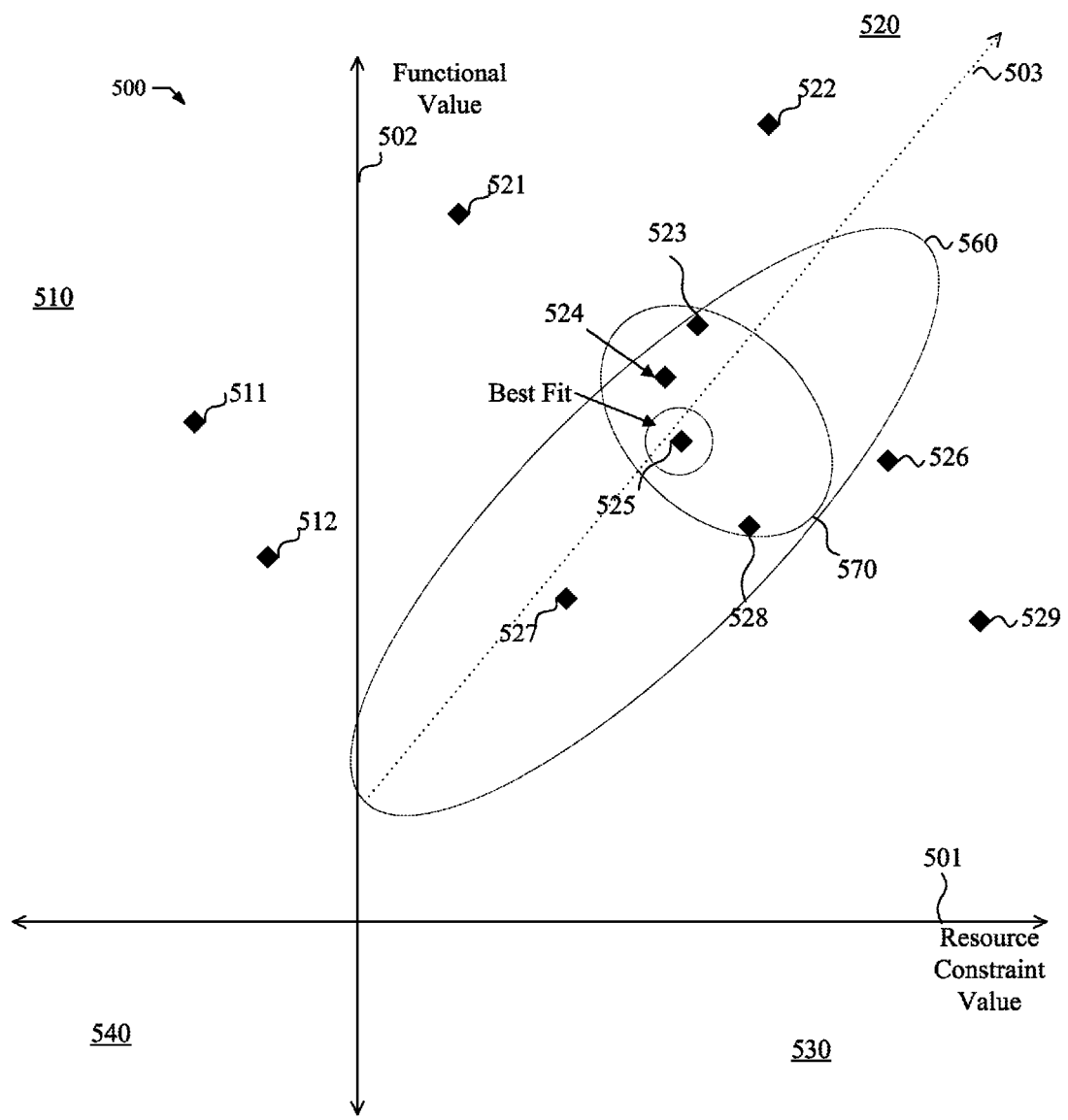
Figure 6A:
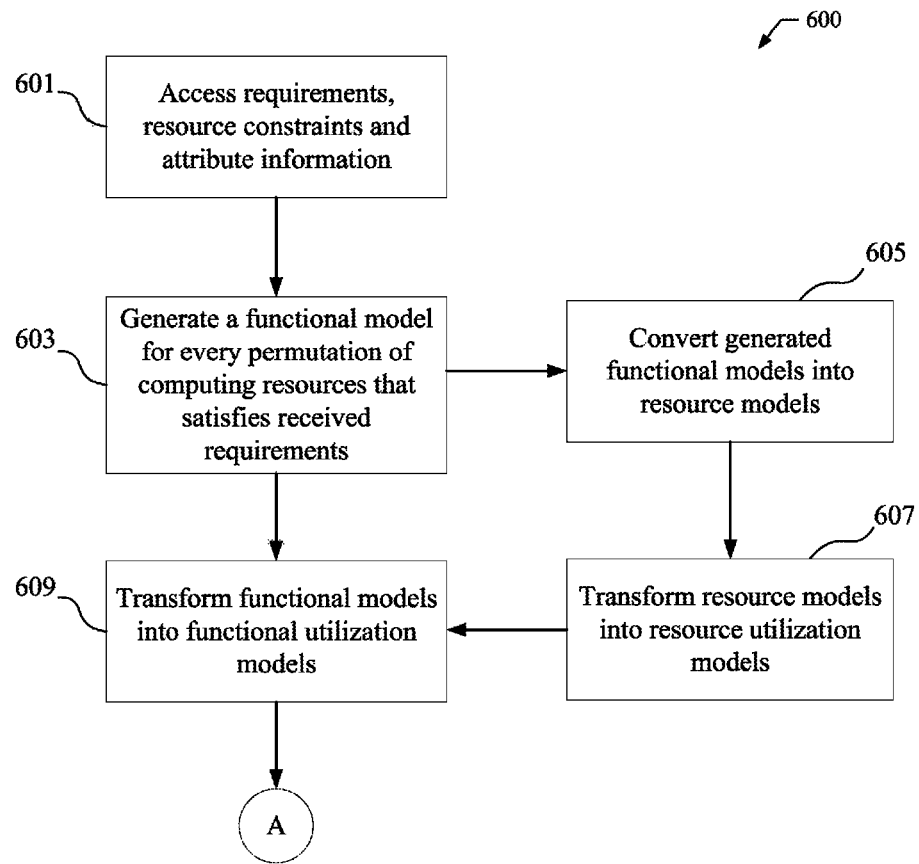
Figure 6B:
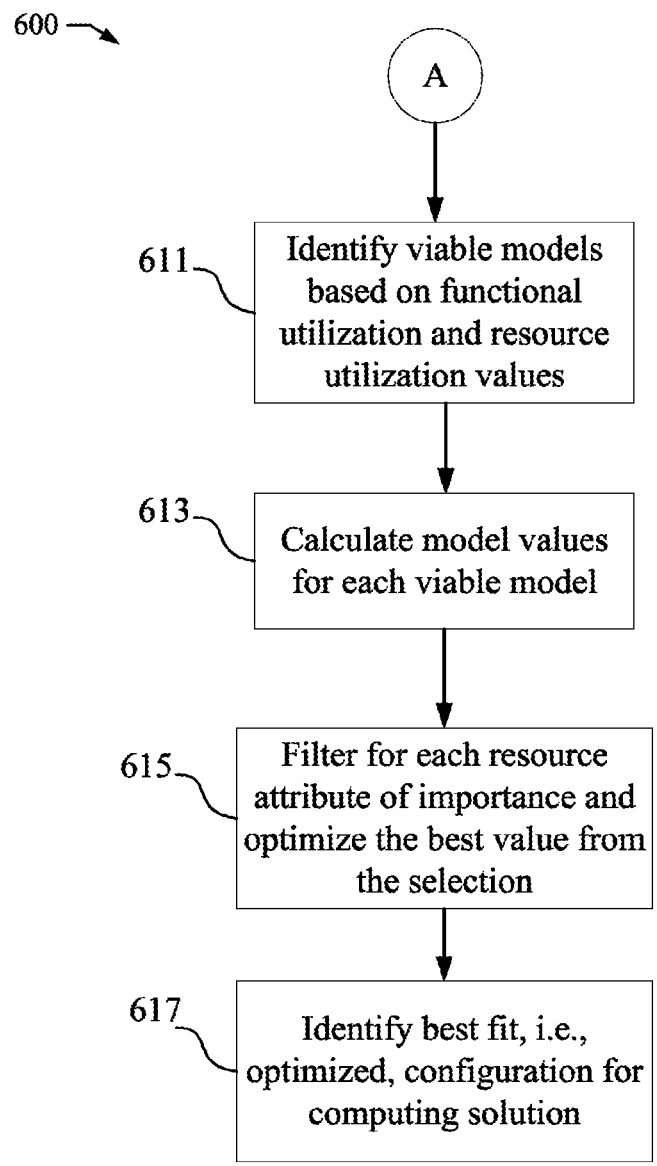
Figure 7A:
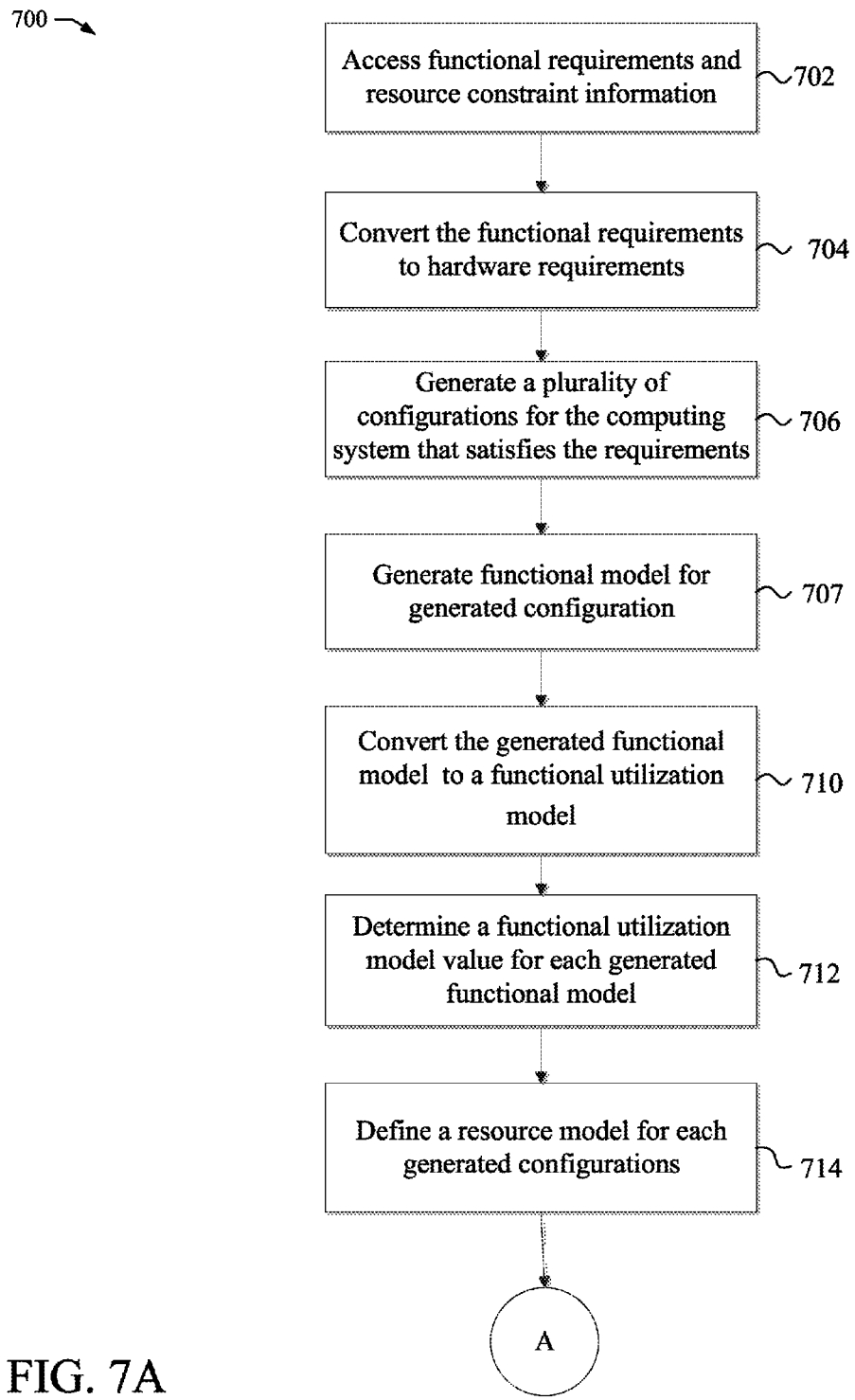
Figure 7B:
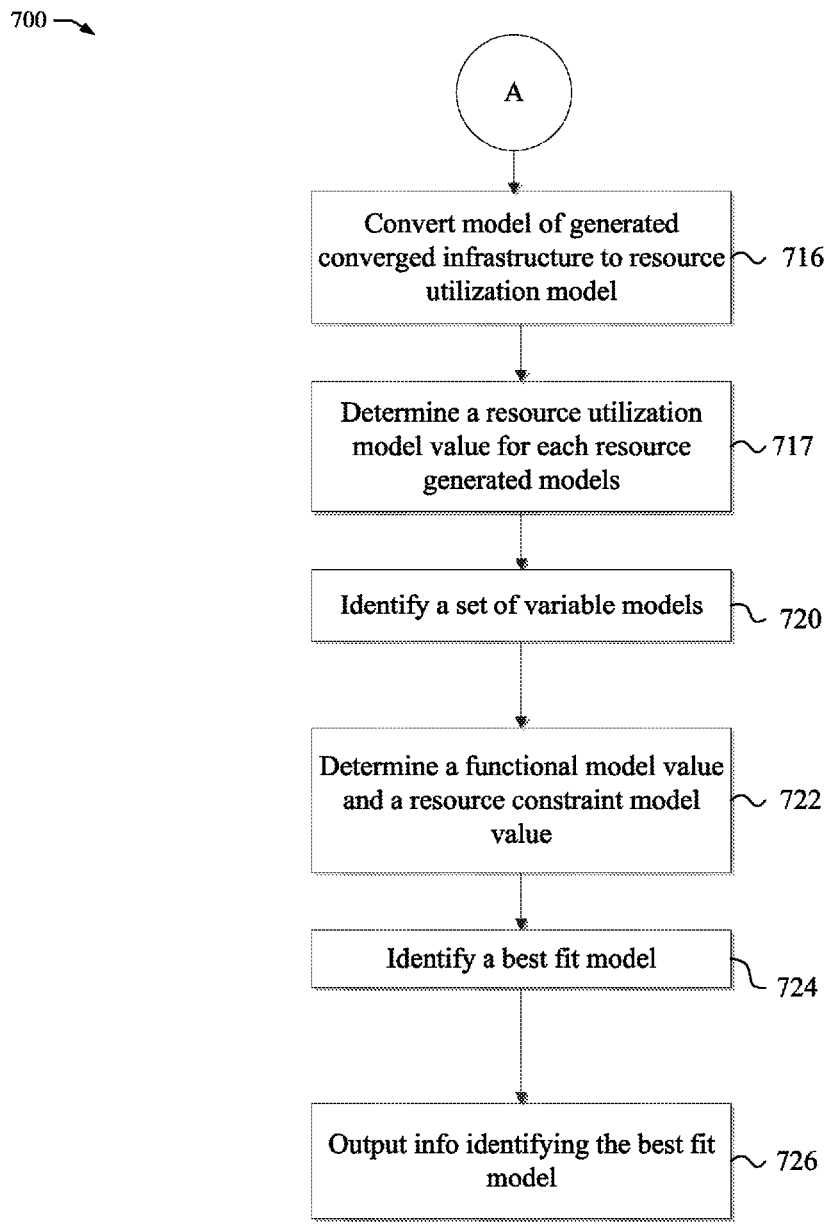
Figure 8:
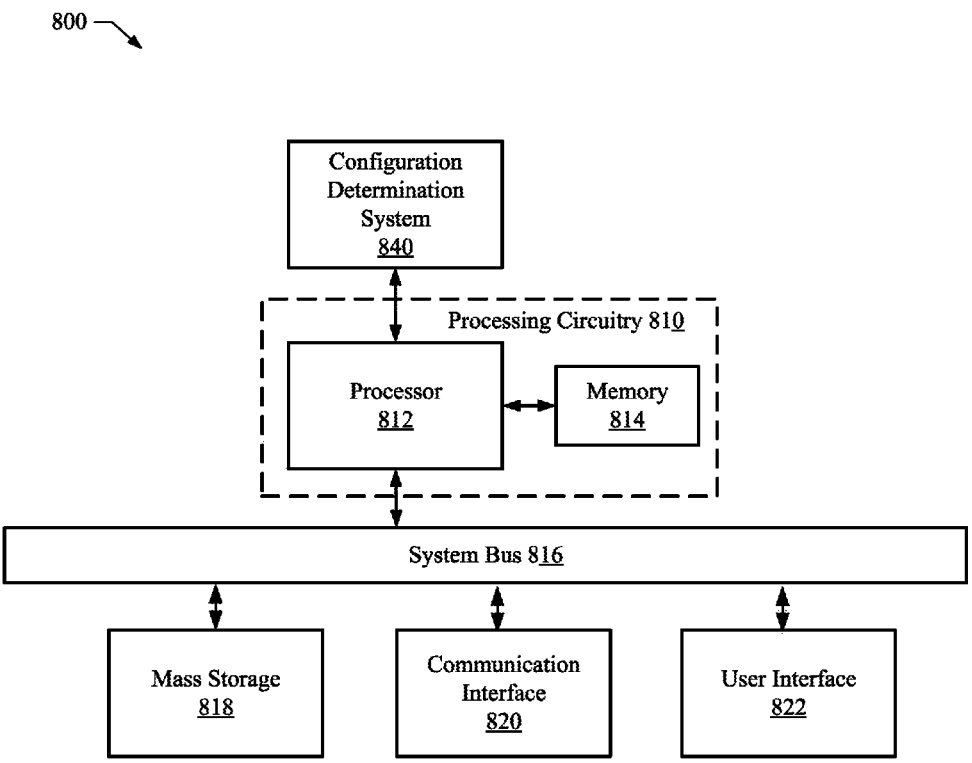

Having thus described the disclosure in general terms, reference will now be made to the accompanying drawings, which are not necessarily drawn to scale, and wherein:

FIG. 1 is a diagram of a converged infrastructure environment, for which a configuration may be determined, in accordance with some example embodiments;

FIG. 2 is a diagram of a virtualization environment, for which a configuration may be determined, in accordance with some example embodiments;

FIG. 3 is a diagram of a logical architecture for a system for determining a configuration for a computing system, in accordance with some example embodiments;

FIG. 4 is a diagram of decision tree for generating all viable configuration for a computing system, in accordance with some example embodiments;

FIG. 5 is a diagram of a map of functional and resource constraint values for generated models, in accordance with some example embodiments;

FIGS. 6A and 6B are a flow diagram of a process for determining an optimized configuration for a computing system, in accordance with some example embodiments;

FIGS. 7A and 7B are a flow diagram of a process for determining an optimized configuration for a computing system, in accordance with other example embodiments; and FIG. 8 is a diagram of a computing system that may be used to implement a system for identifying an optimized configuration for a computing system, in accordance with some example embodiments.

DETAILED DESCRIPTION

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

FIG. 1 is a diagram of an environment 100 for which a configuration may be determined, in accordance with some example embodiments. The environment 100 may include a converged infrastructure 102. The converged infrastructure 102 may include a plurality of components, such as servers, data storage devices, network equipment, and associated software. In some example embodiments, the converged infrastructure is implemented by a Vblock® System available from the VCE Company, LLC of Richardson, Tex.

By way of non-limiting example, in some embodiments, the converged infrastructure for which a configuration may be determined may be a hyper-converged infrastructure. A hyper-converged infrastructure is characterized by a software-centric architecture that tightly integrates servers, data storage devices, network equipment, and associated software and virtualization resources, in a commodity hardware box supported by a single vendor. Hyper-convergence is related to the concept of converged infrastructure, which is an infrastructure approach where a single vendor provides a pre-configured bundle of hardware and software in a single chassis with the goal of minimizing compatibility issues and simplifying management. If required, however, the hardware components of a converged infrastructure can be separated and used independently. The hardware components in a hyper-converged infrastructure, however, are so integrated that they typically cannot be separated. In some example embodiments the hyper-converged infrastructure is implemented by a VxRack™ System, available from the VCE Company, LLC of Richardson, Tex.

The converged infrastructure 102 of some embodiments may include one or more compute layer 110 components, such as one or more servers (e.g., blade servers, rack servers, and/or other servers), one or more fabric extenders, one or more fabric interconnects, a chassis, and/or other compute layer components that may be implemented on a converged infrastructure to provide computing and processing resources of the converged infrastructure. The converged infrastructure 102 may further include one or more storage layer 112 components, such as one or more storage arrays and/or other mass storage devices that may be implemented on a converged infrastructure. In some embodiments, the converged infrastructure 102 may additionally include one or more network layer 114 components, such as one or more switches and/or other network layer components that may be implemented on a converged infrastructure. For example, the network layer 114 may include components that provide switching and routing between the compute layer 110 and storage layer 112 within the converged infrastructure 102. The network layer 114 may additionally or alternatively include components that provide switching and routing between the converged infrastructure 102 and a network so as to support network communication between a component(s) of the converged infrastructure 102 and a computing platform(s) independent of the converged infrastructure 102. The components of the compute layer 110, storage layer 112, and network layer 114 may collectively provide a physical infrastructure of the converged infrastructure 102.

The converged infrastructure 102 may additionally include a virtualization layer 116, which may include one or more virtualization components configured to support one or more virtualized computing environments. The components of the virtualization layer 116 may include components embodied in software, hardware, firmware, and/or some combination thereof. For example, the virtualization layer 116 may include a hypervisor and/or other virtualization components that may be configured to create and run virtual machines and/or to otherwise virtually simulate a computing environment. In some example embodiments, the virtualization layer 116 may include and/or may be communicatively coupled with one or more management components configured to support management of the converged infrastructure 102. For example, in some embodiments, the virtualization layer 116 may include a management infrastructure, which may provide management resources for managing the converged infrastructure 102. In some such embodiments, the management infrastructure may be a separate system from the converged infrastructure, but may be connected to the converged infrastructure to allow management of the entire converged infrastructure 102. In some example embodiments, the virtualization layer 116 may utilize physical hardware resources of the compute layer 110, storage layer 112, and/or network layer 114 to support operation of one or more components of the virtualization layer 116. Additionally or alternatively, in some example embodiments, the virtualization layer 116 may include dedicated physical resources (e.g., physical hardware components) that may provide computing, storage, and/or network communication resources to one or more components of the virtualization layer 116.

It will be appreciated that the compute layer 110, storage layer 112, network layer 114, and virtualization layer 116 as illustrated in FIG. 1 and described above are provided by way of example, and not by way of limitation. In this regard, in some embodiments, aspects of the compute layer 110, storage layer 112, network layer 114, and virtualization layer 116 as described above may not be mandatory and thus some may be omitted in certain embodiments. Additionally, the converged infrastructure 102 of some embodiments may include further or different layers and/or components beyond those illustrated in and described with respect to FIG. 1.

Physical components of the converged infrastructure 102 may be communicatively coupled with each other to support operation of the converged infrastructure 102 via direct connection and/or network communication. For example, as discussed above, in some example embodiments, the network layer 114 may provide switching and routing between physical components of the converged infrastructure.

In some embodiments at least a portion of the components of the converged infrastructure 102 may be assigned addresses, such as Internet Protocol (IP) addresses and/or other network layer addresses, via which the components may be accessed by another component internal to the converged infrastructure 102 and/or via a computing device external to the converged infrastructure 102. For example, in some example embodiments, the converged infrastructure 102 and/or one or more network addressable components thereof may be accessed by an external computing device over a network to which the converged infrastructure 102 of some embodiments may be connected.

FIG. 1 also shows a configuration determination system 104, which may be used to determine a configuration for environment 100, in accordance with some example embodiments. A sample embodiment of the configuration determination system 104 is illustrated in more detail in FIG. 3 and is discussed in more detail in the discussion of FIG. 3 below.

FIG. 2 is a diagram of a machine-level virtualization environment 200, for which a configuration may be determined, in accordance with some example embodiments. It will be appreciated that the components and associated architecture illustrated in and described with respect to FIG. 2 are provided by way of example, and not by way of limitation. In this regard, components illustrated in FIG. 2 and described further below may not be mandatory and thus some may be omitted in certain embodiments. Additionally, some embodiments may include further or different components, beyond those illustrated in and described with respect to FIG. 2. Further, it will be appreciated that converged infrastructures within the scope of the disclosure may implement architectures other than that illustrated in and described with respect to FIG. 2.

The machine-level virtualization environment 200 may include a physical infrastructure 240 configured to support a virtualized infrastructure 250. In some example embodiments, the physical infrastructure 240 may include hardware resources 244, such as servers 246-1 to 246-N (sometimes referred to as "hosts") and one or more storage array networks (SAN), such as SAN 248, which may be communicatively connected by a network (not shown). The physical infrastructure 240, including hardware resources 244 may, for example, provide an embodiment of the compute layer 110, storage layer 112, and network layer 114. For example, the servers 246 may comprise an implementation of the compute layer 110, and the SAN 248 may comprise an implementation of the storage layer 212. The hardware resources 244, including, for example, the servers 246 and SAN 248 may be communicatively connected by an embodiment of the network layer 114.

In some example embodiments, the physical infrastructure 240 may be organized into a "computing-block" based infrastructure, wherein physical infrastructure units may be characterized by repeatable units of construction having similar performance, operational characteristics, and discrete requirements of power, space, and cooling that facilitate rapid deployment, integration, and scalability. The computing-block based infrastructure may be configured to dynamically provision hardware resources based on performance demands placed on the physical infrastructure 240. One such example of physical infrastructure 240 is a Vblock® system available from the VCE Company, LLC.

The physical infrastructure 240 may further include an infrastructure manager 242 configured to manage the configuration, provisioning, and policy compliance of the physical infrastructure 240. Infrastructure manager 242 may be configured to provide an interface by which provisioning of hardware resources 244 (e.g., computing, networking, storage) may be managed with policy-based automation. According to some embodiments, the infrastructure manager 242 may be included in every physical infrastructure 240 to manage the configuration, provisioning, and compliance of computing-block based infrastructure. As described in further detail below, the virtualized infrastructure 250 (or component thereof) of some example embodiments may be configured to connect to and communicate with the infrastructure manager 242 to manage and/or configure the physical infrastructure 240 to support operation of components of the virtualized infrastructure 250. One example of an infrastructure manager 242 includes VCE Vision™ Intelligent Operations available from VCE Company, LLC. In some embodiments, the infrastructure manager 242 may further be configured to provide network manager functionality such that the infrastructure manager 242 may be configured to configure network devices switches, routers) and manage addressing, subsets, virtual local area networks (VLANs), and/or other network configurations that may be implemented on the converged infrastructure 102. One example of a network manager that may be included on the infrastructure manager 242 of such embodiments is a Cisco Switch, such as may be accessible via a Cisco IOS® command line interface (CLI), available from Cisco System, Inc.

The virtualized infrastructure 250 may include a virtualization environment 252 comprising one or more virtual machines (VM) 251, such as VM 251-1 to VM 251-M. Each virtual machine 251 can have an operating system (OS), one or more applications (APP) and an agent (AGENT). In some embodiments, one or more of the virtual machines 251 may be configured to connect to one or more users by a communications network, such as the Internet. The virtualized infrastructure 250 may, for example, comprise an embodiment of at least a portion of the virtualization layer 116.

The virtualization environment 252 may accordingly be configured to simulate (e.g., to virtualize) conventional components of a computing device, such as a processor, system memory, a hard disk drive, and/or the like for executing the VMs 251. For example, each VM 251 may include a virtual processor and a virtual system memory configured to execute an application. Thus, for example, the converged infrastructure 102 of some example embodiments may be configured to perform physical-to-virtual conversion of hardware resources 244 and/or other physical computing of the physical infrastructure 240 to support or host virtual machines 251 in the virtualized infrastructure 250. In this regard, components of the physical infrastructure 240 may include physical components, such as physical servers and/or other computing devices, memories, buses, networks, and/or other physical components, which may collectively support the virtualized infrastructure 250 and VMs 251.

A virtualization manager 254 of the virtualization environment 252 may be configured to establish and oversee the VMs 251. The virtualization manager 254 may be configured to dynamically allocate resources among the virtual machines 251. For example, in some embodiments, the virtualization manger 254 may be configured to communicate with the infrastructure manager 242 to manage and/or configure the physical infrastructure 240 to support operation of the virtual machines 251. The virtualization manager 254 of some example embodiments may be implemented with the VMware® vCenter® virtualized management platform available from VMware, Inc., of Palo Alto, Calif.

In some example embodiments, virtualization environment 252 may be implemented by running VMware vSphere® and/or VMware ESX®-based hypervisor technologies, available from Vmware, Inc., on servers 246. However, it will be appreciated that any virtualization/hypervisor/container technology may be used in addition to or in lieu of VMware hypervisor technologies in accordance with various example embodiments.

FIG. 2 also shows a configuration determination system 260, which may be used to configure machine-level virtualization environment 250, in accordance with some example embodiments. A sample embodiment of the configuration determination system 260 is illustrated in more detail in FIG. 3 and is discussed in more detail in the discussion of FIG. 3 above.

As may be appreciated, rather than determining a configuration for the machine-level virtualization environment 200 shown in FIG. 2, a configuration may be determined for an operating system-level virtualization environment, which is also known as a software container virtualized infrastructure. As also may be appreciated, operating system-level virtualization is a technique where the kernel of an operating system allows for multiple isolated user-space instances. These instances run on top of an existing host operating system and provide a set of libraries that applications interact with, giving them the appearance that they are running on a machine dedicated to their use. These instances are sometimes referred to as software containers and, thus, such an operating system-level virtualization environment may also be referred to as a software container virtualized infrastructure.

FIG. 3 is a diagram of a logical architecture 300 for a system for determining a configuration (e.g., system 260 in FIG. 2) for a computing system, in accordance with some example embodiments. Components of the logical architecture shown in FIG. 3 include input decision filter module 301, core components 303, peripheral components 305, library model 307, solution suitability rating module 319 and output decision filter module 321.

Input decision filter module 301 holds the input vectors and can perform application specific sizing, which can be based on functional specifications, resource specifications, functional design rules and resource design rules. Sources of inputs may include customer specifications such as functional specifications and resource specifications. Additional sources of input are design rules such as functional design rules and resource design rules. In some embodiments, the inputs are calculated as a part of application specific sizing.

Core components 303 may include compute, network, storage and protection and recovery components. Core components 303 define the functionality that is provided by each configuration and are the components that drive the design of each configuration. Peripheral components 305 can include infrastructure, management, software and licensing and services.

The combinations of core components 303 and peripheral components 305 comprise potential configurations. While compute, network and storage core components 303 define the functionality provided by each configuration, protection and recovery core components define business continuity planning.

Peripheral components 305 also may include components of a converged infrastructure configuration. These components can include racks, cabling, small form factor pluggable transceivers (SFP's), etc. Peripheral components also may include configuration management, software and licensing and services. While important, peripheral components 305 do not drive a configuration design. Rather, it is the core components that primarily drive a configuration design, although peripheral components also may drive the configuration design, secondarily. Referring to FIG. 3, unidirectional arrows from core components 303 indicate that core components 303 drive the configuration design. In contrast, the bidirectional arrows associated with peripheral components 305 indicate that peripheral components 305 can either drive the configuration design, or the configuration design can drive the design of peripheral components 305.

Library model 307 may include a component node, a required parent node, an optional parent node, a required sibling node, an optional sibling node, a required child node and an optional child node. Component node 307a may include component metadata 308, as well as parental dependency data, sibling dependency data, child dependency data, additional functional data, additional resource data, root node, internal node and terminal node. Component metadata 308 may include required functional data 316 and required resource data 317. As may be appreciated, required functional data 316 or required resource data 317 may include customer requirements, product design requirements and architectural requirement.

Parental dependency data, sibling dependency data and child dependency data link the configuration components to other components, ensuring that no design results in a "floating part," i.e., a component designed in the configuration but not actually used by the configuration. A parent dependency demonstrates a link to another component and indicates that the component is required. Likewise, a sibling dependency indicates a component is required by another component at the same level. Thus, an example of a parental dependency is a chassis to house the blade; a sibling dependency could be another blade because blades are required to operate in pairs; and a child dependency could be an SFP used to connect the blade to the network.

All nodes have at least one required dependency. A dependency can be required (must be fulfilled to validate the design) or optional (fulfilled only if the right conditions present themselves). The status can be dynamically changed based on the conditions which resulted in that change. Therefore, "required" can become "optional" and vice versa. The component metadata may define the type of node a component may be. This can prevent unrealistic configurations, such as, designing a chassis with no blades or no rack. A chassis therefore can assume the identity of an "internal node" and, as a result, can have a parent link and a child link.

Component metadata 308 also may store more detailed information about an individual model element. Details can include, but are not limited to, generic data such as: part name, shape and graphic image, configuration reference designator, part classification, manufacturer and vendor details, part revision, lifecycle and enterprise core object (ECO) data, current pricing and lead-times, current stock levels and forecasting. Component metadata 308 also may include project specific data, such as, a date a configuration was modified, or project ID.

In some embodiments, component metadata 308 may include additional fields for a component counter and component checksum. The checksum may be an MD5 checksum calculation of an entire component file and may provide a unique id for a model element, which allows for tracking of a model element across other projects. This may be useful when a model element is a result of combining multiple components; the checksum number provides a unique ID for that particular combination. The counter is a "usage tracker" and, in some embodiments, two trackers can be used. A first counter may increment each time the component identified by a checksum has been designed into an optimized configuration. A second counter can track each time the identified component it has been used in a final configuration.

Functional data 316 and resource data 317 are functional and resource specifications associated with each configuration component. Functional data 316 and resource data 317 may contain the technical details related to each component (such as the component's specification, as extracted from the manufacturer datasheet).

In some embodiments, functional data or resource data can be stored initially in an "additional data" field, in which case the "required data" field will be blank, i.e., containing no field definitions or data. Data, however, can flow between the additional and required data fields. (For example, a component that is initially selected for a configuration may be initially classified as additional data). If however, the component is specified by a customer, engineering or an architect, the component's classification may be changed from additional data to required data. As may be appreciated, customer specifications may receive a higher weighing when identifying potential solutions during filtering.

Continuing with FIG. 3, a solution suitability rating component 319 stores utilization model definitions that are generated rates their suitability. Solution suitability may be based on functionality utilization, resource utilization, build frequency, and/or propriety architecture. Functionality utilization and resource utilization may be a linked pair in the architecture because they are co-jointly used in the optimization filtering process. Build frequency is a measure of how often a particular configuration has been delivered to customers. Propriety architecture is a measure of how well the configurations designed adheres to a catalogue product structure. These attributes also may be linked to each other. In some embodiments, a high build frequency can be an important weighing factor in the decision making process.

For example, if the algorithm identifies two solutions and both are strong potentials, then the algorithm can identify the configuration structure that has been built more often as the better choice.

Output decision filter component 321 performs filtering and optimizations after the calculations that are performed in previous stages (e.g., model analysis stage) have been completed. Output decision filter component 321 may include an unfiltered solution suitability component and application centric solutions component. An unfiltered solution suitability component may include functionality, performance and scalability parameters. An application centric solutions component may include cost, lead time and resources parameters.

FIG. 4 is a diagram of decision tree 400 for generating configuration for a computing system, such as a converged infrastructure, in accordance with some example embodiments. In FIG. 4, decision tree diagram 400 depicts decisions made as part of the generation of a model configuration 408 for an exemplary computing system that includes blades, chassis and racks.

Referring to FIG. 4, consider as a starting point a model component, for example a blade server 401 is placed into model configuration 408. As may be appreciated, a blade 401 requires a chassis 405 to host the blade; likewise, a chassis 405 requires a rack 407 to host the chassis. In some example embodiments, where there are two blades 401, 402 with a requirement for a chassis 405, each blade 401, 402 can be linked to a unique slot in chassis 405.

Thus, as illustrated by this example, placing a blade 401 into a configuration results in the generation of a model configuration 408 that includes blades 401-402, chassis 405, 406 and rack 407, which are requirements to enable operation of the blade server. Also, although not illustrated in FIG. 4, a choice of either an 8 GB or a 10 GB SFP is required. It should be appreciated that choices such as this can result in the branching of the configuration design, where one branch will develop further using the 8 GB SPF and the other branch using the 10 GB SFP option. Accordingly, models are generated using such dependency rules. The process continues until the entire configuration has been completed. A configuration is complete when all required dependencies have been populated and every optional dependency has been branched and explored.

FIG. 5 is a diagram of a map 500 of functional and resource constraint values for viable models, in accordance with some example embodiments. Referring to FIG. 5, constraint values for each model can be plotted on first axis 501 and functional values for each model can be plotted on a second axis 520. As can be seen from FIG. 5, the first axis 510 and the second axis 520 define four (4) quadrants, quadrant Q1 510, quadrant Q2 520, quadrant Q3 530 and quadrant Q4 540. All models in quadrant Q2 520, namely, models 521-529, satisfy all functional and resource constraint requirements. Models 511 and 512, which are in quadrant Q1 510 are non-viable models because they have negative constraint values, which means they exceed available resources. As may be appreciated, any models in quadrant Q3 would not satisfy functional requirements, and models in quadrant Q4 would not satisfy the functional or resource constraint requirements.

Continuing with FIG. 5, a set of viable models may be identified as being those located in a quadrant Q2 520, namely, models 521-529. In some example embodiments, a set of models 560, comprising models 523, 524, 525, 527 and 528, which are closest to vector 503 (e.g., a "northeast" or 45 degree vector) are identified as optimized configurations for a computing system. In other example embodiments, a set of models 570, comprising models 523, 524, 525 and 528 are identified as being models representing optimized configurations because they have model values that are closest to vector 503. In yet other example embodiments, model 605, which has a model value closest to vector 503, may be identified as a best fit, i.e., an optimized, configuration for a computing system. As may be appreciated, optimized configurations can be identified using other vectors, which would represent different attributes, which may be prioritized differently.

As may be appreciated, map 500 is a two dimensional view of the generated configurations. However, the problem is more accurately characterized as an n-dimensional problem with an axis for each individual attribute. By focusing on functionality and resources as a grouping, the n-dimensional problem is reduced to a more manageable two-dimensional problem. The primary attribute of a given model, therefore, is the balance of functional and resource requirements. A balanced model will provide the best possible functionality, while utilizing the least amount of resources. In some embodiments, a balanced model is identified by its nearness to vector 503.

FIGS. 6A and 6B illustrate a flow diagram of a process 600 for determining a configuration for a computing system, such as a converged infrastructure, in accordance with some example embodiments. Referring to FIG. 6A, in operation 601, requirements, constraints and attribute information may be received by a configuration determination process 600.

In operation 603, a functional model is generated for every permutation of a plurality of computing resources, including core components and/or peripheral components; that satisfy the received requirements. As may be appreciated, this operation may generate a large number of configurations that will require further analysis to determine an optimized configuration.

In operation 605, the functional models generated are converted into resource models, which represent constraints on resource consumption. Constraints on resource consumption include any limitation to the configuration of the computer system, such as, limitations on the physical space available for the components of the computer system as well as financial limitation and time limitations. In operation 607, the resource models are converted into resource utilization models. And, in operation 609, the functional models are converted into functional utilization models. The functional and resource constraint utilization models facilitate the analysis of the models generated in operation 603 by determining how well each of the modeled configurations matches the received requirements. Process 600 may receive information indicating a resource constraint change (e.g., a new budget or more rack space becomes available), in which case a changed resource utilization model is generated, which reflects the received changed resource constraint information.

In operation 611, process 600 identifies viable (and non-viable) models based on functional and/or resource model utilization values.

In operation 613, a model value is calculated for each viable model identified in operation 611.

In operation 615, the set of viable models identified in operation 611 may be filtered for one or more attributes identified in attribute information accessed by process 600. In some example embodiments, an attribute may be any functional requirement and/or resource constraint that should be optimized. As may be appreciated, attribute information also may include information indicating the relative importance of each attribute identified in the attribute information.

In operation 617, a best fit model, which represents an optimized configuration, may be identified from the set of viable models identified in operation 611 or the filtered set of viable models.

FIGS. 7A and 7B illustrate a flow diagram of a process 700 for determining a configuration for a computing system, such as a converged infrastructure, in accordance with some example embodiments. In operation 702, functional requirements information and resource constraint information is accessed. The accessed functional requirements information may include information about functional requirements for a computing system. In some embodiments, the accessed resource constraint information can include information about one or more resource constraints on the computing system.

In operation 704, the functional requirements information is converted to hardware requirements information. In operation 706, a plurality of functional models is generated, each of which may comprise a plurality of computing components. Each of the plurality of generated functional models satisfies the hardware requirements identified in the hardware requirements information. Each of the plurality of computing components has a hardware specification. In some example embodiments, a set of functional models is generating by using learning decision tree rules.

In operation 708, the generated functional model for each of the plurality of generated configurations is converted to a functional utilization model. The functional utilization model represents the utilization of each of the plurality computing components comprising each of the plurality of generated functional models.

In operation 710, a functional utilization model value is determined for each of the generated functional utilization models. The functional utilization model value is a value representing utilization of the plurality of computing components comprising each of the plurality of generated functional models.

In operation 712, a resource model is defined for each of the plurality of generated configurations. Each of the defined resource models represents resources consumed by the plurality of computing components comprising each of the plurality of generated functional models.

In operation 714, each of the defined resource models is converted to a resource utilization model. The resource utilization model represents resources utilized by the plurality of computing components comprising each of the plurality of generated functional models.

Referring to FIG. 7B, in operation 716, a resource utilization model value is determined for each of the defined resource utilization models. The resource utilization model value is a value that represents resource usage for each of the plurality of computing components relative to resource constraints identified in the resource constraint information.

In operation 718, a set of viable models is identified. The set of viable models is identified based on the determined functional utilization model values and the determined resource utilization model values. In operation 720, for each of the viable models, a functional model value and a resource model value is determined. In some example embodiments, the functional model values and each of the resource constraint model values is determined using root mean squared normalization.

In operation 722, for each of the viable models, a best fit model is identified. The best fit model is identified based on the determined functional model value and the determined resource constraint value. In operation 724, information identifying the best fit model is output.

In some example embodiments, process 700 may access attribute information, which may be information identifying the relative importance of one or more functional requirements and/or resource constraints. The set of viable models may be filtered based on the accessed attribute information.

In some example embodiments, process 700 may determine an overall model value for each of the viable models. The overall model values may be determined by plotting the functional model value on a first axis and the resource model value on a second axis. A best fit model may be identified by identifying a plotted overall model value closest to a predetermined vector, which may be a vector on a northeast path.

FIG. 8 is a diagram of an example computing system 800 that may be used to implement some example embodiments of a configuration determination system. The computing system 800 may be implemented on any computing device or plurality of computing devices that may be configured to implement one or more example embodiments. By way of non-limiting example, in some embodiments, the computing system 800 may be implemented on a user terminal and/or a computing platform(s) of a converged infrastructure.

The computing system may include a plurality of elements, such as processing circuitry 810, mass storage 818, communication interface 820, and user interface 822, which may be interfaced via a system bus 816. It will be appreciated that the components, devices or elements illustrated in and described with respect to FIG. 8 below may not be mandatory and thus some may be omitted in certain embodiments. Additionally, the computing system 800 of some embodiments may include further or different components, devices or elements beyond those illustrated in and described with respect to FIG. 8.

Further, while FIG. 8 illustrates an architecture including elements interfaced via the system bus 816, it will be appreciated that in some example embodiments, elements of the computing system 800 may be implemented in a distributed computing environment in which elements may be distributed across a plurality of computing devices, which may be in communication with each other, such as via a network, to provide functionality of the computing system 800. As such, in some example embodiments, elements of the computing system 800 may be communicatively coupled via a network in addition to or in lieu of the system bus 816.

The computing system 800 of some example embodiments may implement an operating system(s), such as MICROSOFT WINDOWS™, UNIX™, LINUX™, IBM z/OS™, CISCO™ INTERNETWORK OPERATING SYSTEM™ (IOS), CISCO™ CATALYST™ OPERATING SYSTEM (CatOS), CISCO NX-OS, EMC™ ISILON OneFS™ OPERATING SYSTEM, NETAPP™ DATA ONTAP™, or other known operating systems. It should be appreciated; however, that in some embodiments, one or more aspects of the computing system 800 may be implemented on and/or integrated with a virtualized computing system, such as may be provided by a converged infrastructure.

In some example embodiments, the computing system 800 may include processing circuitry 810 that is configurable to perform actions in accordance with one or more example embodiments disclosed herein. In this regard, the processing circuitry 810 may be configured to perform and/or control performance of one or more functionalities for determining a configuration of a converged infrastructure, such as converged infrastructure 602, in accordance with various example embodiments. Thus, the processing circuitry 810 may be configured to perform data processing, application execution and/or other processing and management services according to one or more example embodiments.

In some example embodiments, the processing circuitry 810 may include a processor 812 and, in some embodiments, such as that illustrated in FIG. 8, may further include memory 814. The processing circuitry 810 may be in communication with (e.g., via system bus 816) and/or otherwise control mass storage 818, communication interface 820, and/or user interface 822.

The processor 812 may be embodied in a variety of forms. For example, the processor 812 may be embodied as various hardware processing means such as a microprocessor, a coprocessor, a general purpose processor, a controller or various other computing or processing devices including integrated circuits (e.g., a logic device), such as an ASIC (application specific integrated circuit), an FPGA (field programmable gate array), some combination thereof, or the like. Although illustrated as a single processor, it will be appreciated that the processor 812 may comprise a plurality of processors. The plurality of processors may be in operative communication with each other and may be collectively configured to perform one or more functionalities to support determination of a configuration of a converged infrastructure in accordance with various embodiments. In some embodiments in which the computing system 800 is embodied as a plurality of computing devices, a plurality of processors, which may collectively form the processor 812, may be distributed across a plurality of computing devices that may be in operative communication with each other directly and/or via a network. In some example embodiments, the processor 812 may be configured to execute instructions that may be stored in a memory, such as the memory 814 and/or the mass storage 818 and/or that may be otherwise accessible to the processor 812. As such, whether configured by hardware or by a combination of hardware and software, the processor 812 may be capable of performing operations according to various embodiments while configured accordingly.

In embodiments including the memory 814, the memory 814 may include read only memory (ROM), random access memory (RAM), and/or the like. The mass storage 818 may include one or more memory and/or other storage devices, which may include fixed (e.g., a fixed hard disc drive, storage array, fixed flash memory device, and/or the like) and/or removable memory devices (e.g., a removable flash memory device, an optical disc drive, and/or other removable memory device). The mass storage 818 may provide a persistent data storage device. In some example embodiments, the mass storage 818 may be configured to provide a backup storage. The mass storage 818 may include a memory device implemented locally to the computing system 800 and/or a memory device remote to the computing system 800, which may be communicatively coupled with the computing system 800, such as via a network. In some embodiments in which the computing system 800 is embodied as a plurality of computing devices, the memory 814 and/or mass storage 818 may include a plurality of memory devices, which may be distributed across a plurality of computing devices that may be in operative communication with each other directly and/or via a network to form the computing system 800.

In some embodiments, the memory 814 and/or the mass storage 818 may provide a non-transitory computer-readable storage medium that may store computer program instructions that may be executed by the processor 812. In this regard, the memory 814 and/or mass storage 818 may be configured to store information, data, applications, instructions and/or the like for enabling the computing system 800 to carry out various functions in accordance with one or more example embodiments. Applications that may be executed by the processor 812 may also be in the form of modulated electronic signals that may be accessed via a network modem or other network interface of the computing system 800.

The computing system 800 may further include a communication interface 820. The communication interface 820 may enable the computing system 800 to communicate (e.g., over a network or other communication interface) with another computing device or system, such as the converged infrastructure 102. In this regard, the communication interface 820 may include one or more interface mechanisms for enabling communication with other devices and/or networks. As such, the communication interface 820 may include, for example, an antenna (or multiple antennas) and supporting hardware and/or software for enabling communications with a wireless communication network (e.g., a cellular network, wireless local area network, and/or the like) and/or a communication modem or other hardware/software for supporting communication via cable, digital subscriber line (DSL), USB, FireWire, Ethernet, one or more optical transmission technologies, and/or other wireline networking methods.

In some example embodiments, the computing system 800 may include the user interface 822. It will be appreciated, however, that in some example embodiments, one or more aspects of the user interface 822 may be omitted, and in some embodiments, the user interface 822 may be omitted entirely. The user interface 822 may be in communication with the processing circuitry 810 to receive an indication of a user input and/or to provide an audible, visual, mechanical, or other output to a user. As such, the user interface 822 may include, for example, a keyboard, a mouse, a joystick, a display, a touch screen display, a microphone, a speaker, one or more biometric input devices, and/or other input/output mechanisms.

As shown in FIG. 8, in some example embodiments, a resource identification system 840 interfaces with computing system 800. As discussed above in connection with FIG. 2, the configuration determination system 840 may be configured to facilitate the identification of computing resources for deployment of a software application.

Embodiments described herein may be practiced with various computer system configurations including blade devices, cloud systems, converged infrastructure systems, rack mounted servers, switches, storage environments, hand-held devices, tablets, microprocessor systems, microprocessor-based or programmable consumer electronics, mini computers, mainframe computers and the like. Some embodiments may also be practiced in distributed computing environments where tasks are performed by remote processing devices that are linked through one or more networks, such as one or more wireline networks and/or one or more wireless networks.

A computer program product may be used to implement a configuration determination system, in some example embodiments. A computer program product embodiment may include a machine-readable, non-transitory (non-volatile) storage medium (media) having instructions stored thereon/in, which can be used to program a computer to perform any of the processes of the embodiments described herein. Computer code for operating and configuring a configuration determination system is preferably downloaded and stored on a hard disk, although the entire program code, or portions thereof, may also be stored in any other volatile or non-volatile memory medium or device as is well known, such as a read only memory (ROM) or random access memory (RAM), or provided on any media capable of storing program code, such as any type of rotating or solid state media, or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), local area network (LAN), etc.) using any communication medium and protocols (e.g., transmission control protocol/internet protocol (TCP/IP), hypertext transport protocol (HTTP), HTTP secure (HTTPS), Ethernet, etc.) as are well known. It may be appreciated that computer code for implementing embodiments of the present invention can be implemented in any programming language that can be executed on a client system and/or server or server system such as, for example, C, C++, hypertext markup language (HTML), any other markup language, Java™, JavaScript, ActiveX, any other scripting language, such as VB Script, and many other programming languages as are well known may be used.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

What is claimed is:

1. A method for determining an optimal configuration for a computing system, the method comprising:
   accessing functional requirements information and resource constraint information, wherein accessed functional requirements information is comprised of information about functional requirements for a computing system, and wherein the accessed resource constraint information is comprised of information about one or more resource constraints on the computing system;
   generating a plurality of functional models, wherein each of the plurality of generated functional models is comprised of a plurality of computing components that satisfy the functional requirements identified in the functional requirements information;
   determining a functional utilization model value for each of the generated functional models, wherein the determined functional utilization model value is a value representing utilization of the plurality of computing components of the plurality of generated functional models;
   generating a resource utilization model for each of the plurality of generated functional models, wherein each of the generated resource utilization models represents resources consumed by the plurality of computing components of the plurality of generated functional models;
   determining a resource utilization model value for each of the generated resource utilization models, wherein the determined resource utilization model value is a value representing resource usage of each of the plurality of computing components comprising a subset of the plurality of generated functional models relative to resource constraints identified in the resource constraint information, wherein each of the functional utilization model values and each of the resource utilization model values is determined as a deviation from a predetermined vector, wherein root mean squared normalization determines the deviation;
   identifying a set of viable models, wherein the set of viable models is identified based on the determined functional utilization model values and the determined resource utilization model values;
   for each of the viable models, determining a functional model value and a resource constraint model value, wherein the resource constraint model value is a value representing the resource constraints;
   for each of the viable models, identifying a best fit model, wherein the best fit model is identified based on the determined functional model value and the determined resource constraint model value; and
   outputting information identifying the best fit model.

2. The method of claim 1, further comprising:
   generating the set of viable models by using learning decision tree rules, wherein a decision tree comprises a set of learning tree decision rules that are used to make a value determination for one or more leaf nodes based upon observations of the generated functional utilization model values and the generated resource utilization model values.

3. The method of claim 1, further comprising:
accessing attribute information, and wherein the accessed attribute information is information identifying the relative importance of each of a plurality of attributes for the computing system; and
identifying the best fit model based on the accessed attribute information.

4. The method of claim 1, wherein the step of identifying the best fit model is further comprised of:
for each of the viable modes within the identified set of viable models, determining an overall model value, wherein the overall model value is a function of the functional model value on a first axis and the resource constraint model value on a second axis;
plotting each of the determined overall model values on a value map; and
identifying the best fit model by identifying the plotted overall model value closest to a predetermined vector.

5. The method of claim 4, wherein the predetermined vector is a northeast path of a plotting having the first axis representing the functional model value and the second axis representing the resource constraint model value.

6. The method of claim 1, wherein the computing system is deployed in a converged infrastructure environment.

7. A computer implemented system for determining an optimal configuration for a computing system, the system comprising:
at least one processor; and
at least one memory storing computer program code, wherein the at least one memory and stored computer program code are configured, with the at least one processor, to cause the system to at least:
access functional requirements information and resource constraint information, wherein accessed functional requirements information is comprised of information about functional requirements for a computing system, and wherein the accessed resource constraint information is comprised of information about one or more resource constraints on the computing system;
generate a plurality of functional models, wherein each of the plurality of generated functional models is comprised of a plurality of computing components that satisfy functional requirements identified in the functional requirements information;
determine a functional utilization model value for each of the generated functional models, wherein the determined functional utilization model value is a value representing utilization of the plurality of computing components of the plurality of generated functional models;
generate a resource utilization model for each of the plurality of generated functional models, wherein each of the generated resource utilization models represents resources consumed by the plurality of computing components of the plurality of generated functional models;
determine a resource utilization model value for each of the generated resource utilization models, wherein the determined resource utilization model value is a value representing resource usage of each of the plurality of computing components comprising a subset of the plurality of generated functional models relative to resource constraints identified in the resource constraint information, wherein each of the functional utilization model values and each of the resource utilization model values is determined as a deviation from a predetermined vector, wherein root mean squared normalization determines the deviation;
identify a set of viable models, wherein the set of viable models is identified based on the determined functional utilization model values and the determined resource utilization model values;
for each of the viable models, determine a functional model value and a resource constraint model value, wherein the resource constraint model value is a value representing the resource constraints;
for each of the viable models, identify a best fit model, wherein the best fit model is identified based on the determined functional model value and the determined resource constraint model value; and
output information identifying the best fit model.

8. The system of claim 7, wherein the set of viable models is generated by using learning decision tree rules, wherein a decision tree comprises a set of learning tree decision rules that are used to make a value determination for one or more leaf nodes based upon observations of the generated functional utilization model values and the generated resource utilization model values.

9. The system of claim 7, wherein the at least one memory and stored computer program code are configured, with the at least one processor, to further cause the system to:
access attribute information, and wherein the accessed attribute information is information identifying the relative importance of each of a plurality of attributes for the computing system; and
identify the best fit model based on the accessed attribute information.

10. The system of claim 7, wherein the at least one memory and stored computer program code are configured, with the at least one processor, to further cause the system to:
for each of the viable models within the identified set of viable models, determine an overall model value, wherein the overall model value is a function of the functional model value on a first axis and the resource constraint model value on a second axis;
plot each of the determined overall model values on a value map; and
identify the best fit model by identifying the plotted overall model value closest to a predetermined vector.

11. The system of claim 10, wherein the predetermined vector is a northeast path of a plotting having the first axis representing the functional model value and the second axis representing the resource constraint model value.

12. The system of claim 7, wherein the computing system is deployed in a converged infrastructure environment.

13. The computer-readable media of claim 7, wherein the specification is associated with specific storage capabilities, including at least one from a set consisting of: a level of capacity, a level of performance, a level of redundancy, and an availability.

14. A computer program product for determining an optimal configuration for a computing system, the computer program product comprising at least one non-transitory computer-readable storage medium having program instructions stored thereon, which when executed by at least one processor, cause the at least one processor to perform a method comprising:
accessing functional requirements information and resource constraint information, wherein accessed functional requirements information is comprised of information about functional requirements for a computing system, and wherein the accessed resource constraint information is comprised of information about one or more resource constraints on the computing system;

generating a plurality of functional models, wherein each of the plurality of generated functional models is comprised of a plurality of computing components that satisfy functional requirements identified in the functional requirements information;

determining a functional utilization model value for each of the generated functional models, wherein the determined functional utilization model value is a value representing utilization of the plurality of computing components of the plurality of generated functional models;

generating a resource utilization model for each of the plurality of generated functional models, wherein each of the generated resource utilization models represents resources consumed by the plurality of computing components of the plurality of generated functional models;

determining a resource utilization model value for each of the generated resource utilization models, wherein the determined resource utilization model value is a value representing resource usage of each of the plurality of computing components comprising a subset of the plurality of generated functional models relative to resource constraints identified in the resource constraint information, wherein each of the functional utilization model values and each of the resource utilization model values is determined as a deviation from a predetermined vector, wherein root mean squared normalization determines the deviation;

identifying a set of viable models, wherein the set of viable models is identified based on the determined functional utilization model values and the determined resource utilization model values;

for each of the viable models, determining a functional model value and a resource constraint model value, wherein the resource constraint model value is a value representing the resource constraints;

for each of the viable models, identifying a best fit model, wherein the best fit model is identified based on the determined functional model value and the determined resource constraint model value; and outputting information identifying the best fit model.

15. The computer program product of claim 14, wherein the least one non-transitory computer-readable storage medium having program instructions stored thereon, which when executed by the at least one processor, cause the at least one processor to perform a method further comprising:

accessing attribute information, and wherein the accessed attribute information is information identifying the relative importance of each of a plurality of attributes for the computing system; and identifying the best fit model based on the accessed attribute information.

16. The computer program product of claim 14, wherein the least one non-transitory computer-readable storage medium having program instructions stored thereon, which when executed by the at least one processor, cause the at least one processor to perform a method further comprising:

for each of the viable models within the identified set of viable models, determining an overall model value, wherein the overall model value is a function of the model value on a first axis and the resource constraint model value on a second axis;

plotting each of the determined overall model values on a value map; and identifying the best fit model by identifying the plotted overall model value closest to a predetermined vector.

17. The computer program product of claim 16, wherein the predetermined vector is a northeast path of a plotting having the first axis representing the functional model value and the second axis representing the resource constraint model value.

* * * * *